US012710147B2

(12) United States Patent
Zhou et al.

(10) Patent No.: US 12,710,147 B2
(45) Date of Patent: Aug. 18, 2026

(54) LAMP ASSEMBLY AND TRIM FOR LAMP ASSEMBLY

(71) Applicant: SAVANT TECHNOLOGIES LLC, East Cleveland, OH (US)

(72) Inventors: Huisheng Zhou, Shanghai (CN); Minjie Ji, Shanghai (CN); Weikang Dai, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 19/258,397

(22) Filed: Jul. 2, 2025

(65) Prior Publication Data

US 2026/0117947 A1 Apr. 30, 2026

(30) Foreign Application Priority Data

Jul. 25, 2024 (CN) ........................ 202421780777.X

(51) Int. Cl.
*F21S 8/02* (2006.01)
*F21V 17/02* (2006.01)
*F21V 21/04* (2006.01)

(52) U.S. Cl.
CPC ................ *F21S 8/02* (2013.01); *F21V 17/02* (2013.01); *F21V 21/04* (2013.01)

(58) Field of Classification Search
CPC ..... F21S 8/02; F21V 17/06; F21V 21/03–049
See application file for complete search history.

(56) References Cited

U.S. PATENT DOCUMENTS 7,530,705 B2 * 5/2009 Czech ........................ F21S 8/02 362/147
2013/0322093 A1 12/2013 Ono et al.
2023/0111632 A1 4/2023 Cohen et al.

FOREIGN PATENT DOCUMENTS

CN 2530150 Y 1/2003

* cited by examiner

*Primary Examiner* — Jason M Han
(74) *Attorney, Agent, or Firm* — Wood IP LLC; Theodore A. Wood

(57) ABSTRACT

Provided is a lamp assembly and a trim for the lamp assembly that includes a lamp body and a trim, the lamp body has a mounting device, and the trim has a connecting device, and the lamp assembly has a first mounting configuration and a second mounting configuration, in the first mounting configuration, the trim is mounted in a direction from a light-emitting side to a back side of the lamp body; and in the second mounting configuration, the trim is mounted in a direction from the back side toward the light-emitting side of the lamp body; in the two mounting configurations, the positions of the trim with respect to the lamp body are different. Different mounting configurations are available to mount the trim at different positions on the lamp body, so as to satisfy different appearance requirements.

21 Claims, 14 Drawing Sheets

LAMP ASSEMBLY AND TRIM FOR LAMP ASSEMBLY

CROSS-REFERENCE TO RELATED APPLICATIONS

This application claims priority to Chinese Patent Application Serial Number 202421780777X, filed Jul. 25, 2024, which is herein incorporated by reference.

TECHNICAL FIELD

The present disclosure relates to the field of illumination lamps, and in particular, to a lamp assembly and a trim for the lamp assembly.

BACKGROUND

Currently, most lamp assemblies on the market, particularly downward-emitting lamp assemblies which can also be referred to as downlights, have two types of trims, in which one type is a recessed trim which can also be referred to as a baffle trim, and the other type is a flush-mounted trim. The flush-mounted trim has a better appearance, but a recessed appearance can better reduce glare issues, and different consumers prefer different appearances.

Samples on the market only have the appearance of a flush-mounted trim or only have the appearance of a recessed trim. These two appearances cannot be converted to each other in the same lamp; in addition, the recessed trim also cannot be adjusted for depth.

SUMMARY OF THE INVENTION

In order to overcome the described defects existing in the prior art, the present application aims to provide a lamp assembly and a trim for the lamp assembly, so as to mount the trim at different positions on a lamp body, thereby using a single trim to satisfy different appearance requirements.

According to one aspect of the present disclosure, provided is a lamp assembly, comprising a lamp body and a trim arranged around the periphery of the lamp body, particularly, the trim comprises: a hollow cylindrical body; and a trim ring, extending radially outward from the cylindrical body; wherein the lamp body comprises a light-emitting side and a back side opposite the light-emitting side, an axial extension direction of the lamp body is defined between the light-emitting side and the back side, and the lamp body is provided with a mounting device; wherein the trim is provided with a connecting device adapted to be connected to the mounting device of the lamp body, wherein the mounting device and the connecting device are configured to have a first assembly position and a second assembly position different from the first assembly position, and wherein the trim and the lamp body are configured such that the lamp assembly has a first mounting configuration and a second mounting configuration, in which in the first mounting configuration, the trim is mounted in a direction from the light-emitting side toward the back side of the lamp body, and the trim and the lamp body are assembled together in the first assembly position; and in the second mounting configuration, the trim is mounted in a direction from the back side toward the light-emitting side of the lamp body, and the trim and the lamp body are assembled together in the second assembly position, and wherein in the first mounting configuration and the second mounting configuration, the positions of the trim with respect to the lamp body in the axial extension direction are different. Accordingly, two mounting configurations are realized by using a single trim, and different light-emitting and display effects of the lamp assembly are realized.

Further, the mounting device of the lamp body comprises a first mounting structure and a second mounting structure; the connecting device of the trim comprises a first connecting structure adapted to be connected to the first mounting structure and a second connecting structure adapted to be connected to the second mounting structure; in the first mounting configuration, the trim is mounted to the first mounting structure on the lamp body by using the first connecting structure; in the second mounting configuration, the trim is mounted to the second mounting structure on the lamp body by using the second connecting structure; and the lamp assembly has a central axis, and a first radial distance from a joining position between the first mounting structure and the first connecting structure to the central axis is greater than a second radial distance from a joining position between the second mounting structure and the second connecting structure to the central axis. Accordingly, two mounting configurations are achieved by using a single trim, and the trim can be easily and quickly mounted on the lamp body.

Further, the first mounting configuration is a recessed mounting configuration in which the light-emitting side of the lamp body is mounted in a recessed manner relative to the trim ring; and the second mounting configuration is a flush mounting configuration in which the light-emitting side of the lamp body is mounted flush with respect to the trim ring. Accordingly, the same lamp assembly can achieve both the appearance of a flush-mounted trim and the appearance of a baffle trim without requiring the addition of additional components.

Further, the cylindrical body has a first end and a second end opposite the first end, and the direction from the first end to the second end is consistent with the light-emitting direction of the light-emitting side of the lamp body; and the cylindrical body has a tapered shape in a direction from the second end to the first end. Accordingly, the trim can be easily and quickly mounted on the lamp body.

Further, the connecting device is provided at the first end of the cylindrical body, and the trim ring is provided at the second end of the cylindrical body. Accordingly, the position design of the connecting device is reasonable, and the structure of the cylindrical body is compact.

Further, the first mounting structure of the lamp body is located on an outer circumference of the light-emitting side of the lamp body, and the second mounting structure of the lamp body is located on an outer circumference of a region between the light-emitting side and the back side of the lamp body; and one or both of the first mounting structure and the second mounting structure of the lamp body are configured with a flange or groove in a radial direction, and one or both of the first connecting structure and the second connecting structure of the trim are correspondingly configured with a matching groove or flange in the radial direction. Accordingly, the trim can be easily and quickly mounted on the lamp body.

Further, the connecting device of the cylindrical body comprises an annular groove portion arranged around a central axis of the cylindrical body, and both the first mounting structure and the second mounting structure of the lamp body are configured to be suitable for fitting into the structure of the annular groove portion; and the annular groove portion comprises a first wall and a second wall facing each other and an intermediate wall connecting the first wall and the second wall, the first wall and the second wall extending in a radial direction of the cylindrical body, and the intermediate wall extending in an axial extension direction of the cylindrical body, wherein a radially inner end of the first wall forms the first connecting structure, and a radially inner end of the second wall forms the second connecting structure. Accordingly, the annular groove portion of the trim can be used as both the first connecting structure and the second connecting structure, thereby optimizing the structural design of the trim.

Further, the second mounting structure of the lamp body has a wedge shape in cross section; the wedge shape comprises a planar surface extending in the radial direction of the lamp body and an inclined surface inclined relative to the planar surface, and the planar surface is configured to be adapted to abut against the surface of the second wall of the annular groove portion in the second mounting configuration. Accordingly, the trim can be easily and quickly mounted on the lamp body.

Further, the first mounting structure of the lamp body has an annular flange on the outer circumference of the light-emitting side of the lamp body and a recessed portion on one side of the annular flange; the annular flange is configured to be suitable for fitting into the annular groove portion of the connecting device in the first mounting configuration, and the recessed portion is adapted to receive the first wall of the annular groove portion. Accordingly, the trim can be easily and quickly mounted on the lamp body.

Further, the cylindrical body of the trim comprises a plurality of detachable annular segments, so as to achieve different recessed depths of the light-emitting side of the lamp body with respect to the trim ring. Accordingly, in the recessed mounting configuration, the trim is easy and fast to mount, thereby satisfying the requirements of different baffle depths.

Further, the first connecting structure of the cylindrical body and the first mounting structure of the lamp body are connected by any one or more connection manners of snap-fit connection, threaded connection, magnetic connection and clamp connection; and the second connecting structure of the cylindrical body and the second mounting structure of the lamp body are connected by any one or more connection manners of snap-fit connection, threaded connection, magnetic connection and clamp connection. Accordingly, the most suitable connection manner can be selected according to practical application scenarios and requirements, thereby improving the flexibility.

Further, the lamp assembly is a downward-emitting lamp assembly; the cylindrical body has a first end and a second end opposite the first end, and the direction from the first end to the second end is consistent with the light-emitting direction of the light-emitting side of the lamp body; and the trim comprises a support wall extending upwardly and radially inwardly from a central region of the inner circumference of the cylindrical body toward the first end of the cylindrical body; and the support wall and the first end of the cylindrical body together serve as the first connecting structure to be assembled with the first mounting structure on the lamp body, thereby realizing the first mounting configuration. Accordingly, the lamp assembly can be applied to an ultra-thin lamp body, thereby increasing the universality of a product.

Further, the lamp body comprises a mounting frame detachably provided on the back side of the lamp body, the mounting frame being provided with a snap-fit portion; in the second mounting configuration, the snap-fit portion is used as the second mounting structure, the tail end of the support wall is used as the second connecting structure, and the snap-fit portion is adapted to receive and fix the tail end of the support wall. Accordingly, the lamp assembly is suitable for an ultra-thin lamp body, and the trim can be easily and quickly mounted on the lamp body.

According to another aspect of the present disclosure, provided is a trim for a lamp assembly, the lamp assembly comprising a lamp body and a trim arranged around the periphery of the lamp body, particularly, the trim comprises: a hollow cylindrical body; and a trim ring, extending radially outward from the cylindrical body; wherein the lamp body comprises a light-emitting side and a back side opposite the light-emitting side, an axial extension direction of the lamp body is defined between the light-emitting side and the back side, and the lamp body is provided with a mounting device; wherein the trim is provided with a connecting device adapted to be connected to the mounting device of the lamp body, wherein the mounting device and the connecting device are configured to have a first assembly position and a second assembly position different from the first assembly position, and wherein the trim and the lamp body are configured such that the lamp assembly has a first mounting configuration and a second mounting configuration, in which in the first mounting configuration, the trim is mounted in a direction from the light-emitting side toward the back side of the lamp body, and the trim and the lamp body are assembled together in the first assembly position; and in the second mounting configuration, the trim is mounted in a direction from the back side toward the light-emitting side of the lamp body, and the trim and the lamp body are assembled together in the second assembly position, and wherein in the first mounting configuration and the second mounting configuration, the positions of the trim with respect to the lamp body in the axial extension direction are different.

Further, the mounting device of the lamp body comprises a first mounting structure and a second mounting structure; the connecting device of the trim comprises a first connecting structure adapted to be connected to the first mounting structure and a second connecting structure adapted to be connected to the second mounting structure; in the first mounting configuration, the trim is mounted to the first mounting structure on the lamp body by using the first connecting structure; in the second mounting configuration, the trim is mounted to the second mounting structure on the lamp body by using the second connecting structure; and the lamp assembly has a central axis, and a first radial distance from a joining position between the first mounting structure and the first connecting structure to the central axis is greater than a second radial distance from a joining position between the second mounting structure and the second connecting structure to the central axis. Accordingly, two mounting configurations are achieved by using a single trim, and the trim can be easily and quickly mounted on the lamp body.

Further, the first mounting configuration is a recessed mounting configuration in which the light-emitting side of the lamp body is mounted in a recessed manner relative to the trim ring; and the second mounting configuration is a flush mounting configuration in which the light-emitting side of the lamp body is mounted flush with respect to the trim ring.

Further, the cylindrical body has a first end and a second end opposite the first end, and the direction from the first end to the second end is consistent with the light-emitting direction of the light-emitting side of the lamp body; and the cylindrical body has a tapered shape in a direction from the second end to the first end.

Further, the connecting device is provided at the first end of the cylindrical body, and the trim ring is provided at the second end of the cylindrical body.

Further, the connecting device of the cylindrical body comprises an annular groove portion arranged around a central axis of the cylindrical body, and both the first mounting structure and the second mounting structure of the lamp body are configured to be suitable for fitting into the structure of the annular groove portion; and the annular groove portion comprises a first wall and a second wall facing each other and an intermediate wall connecting the first wall and the second wall, the first wall and the second wall extending in a radial direction of the cylindrical body, and the intermediate wall extending in an axial extension direction of the cylindrical body, wherein a radially inner end of the first wall forms the first connecting structure, and a radially inner end of the second wall forms the second connecting structure.

Further, the cylindrical body of the trim comprises a plurality of detachable annular segments, so as to achieve different recessed depths of the light-emitting side of the lamp body with respect to the trim ring.

Further, the first connecting structure of the cylindrical body and the first mounting structure of the lamp body are connected by any one or more connection manners of snap-fit connection, threaded connection, magnetic connection and clamp connection; and the second connecting structure of the cylindrical body and the second mounting structure of the lamp body are connected by any one or more connection manners of snap-fit connection, threaded connection, magnetic connection and clamp connection.

Further, the lamp assembly is a downward-emitting lamp assembly; the cylindrical body has a first end and a second end opposite the first end, and the direction from the first end to the second end is consistent with the light-emitting direction of the light-emitting side of the lamp body; and the trim comprises a support wall extending upwardly and radially inwardly from a central region of the inner circumference of the cylindrical body toward the first end of the cylindrical body; and the support wall and the first end of the cylindrical body together serve as the first connecting structure to be assembled with the first mounting structure on the lamp body, thereby realizing the first mounting configuration.

In conclusion, the lamp assembly and the trim for the lamp assembly in the present disclosure can achieve at least the following beneficial technical effects:

First, the trim can be easily and quickly mounted on the lamp body.

Second, the same lamp assembly can achieve both the appearance of a flush-mounted trim and the appearance of a baffle trim by using a single trim, without requiring the addition of additional components.

Third, in the recessed mounting configuration, the trim is easy and fast to mount, thereby satisfying the requirements of different baffle depths.

Fourth, the design can also be applied to ultra-thin downlights.

BRIEF DESCRIPTION OF THE DRAWINGS

The drawings are used for providing further understanding of the present disclosure and constitute a part of the present disclosure, and the illustrative embodiments of the present disclosure and illustrations thereof are used for explaining the present disclosure, rather than constituting inappropriate limitation on the present disclosure. In the drawings.

DETAILED DESCRIPTION

Hereinafter, the technical solutions in embodiments of the present disclosure will be described in detail with reference to the accompanying drawings in the embodiments of the present disclosure. It is to be noted that embodiments in the present disclosure and features in the embodiments may be combined with one another without conflicts.

In the following detailed illustration, reference is made to the accompanying drawings which form a part of the present description, in which specific embodiments which can implement the present disclosure are shown by way of illustration. With regard to the drawings, directional terms, such as “top”, “bottom”, “inner”, “outer”, “upper”, “lower”, “front”, “rear”, and the like, are used with reference to the directions of the drawings as described. As assemblies in the embodiments of the present disclosure may be placed in many different directions, the directional terms are used for purposes of illustration only, and are not intended for limiting. It is to be understood that other embodiments may be used, and structural or logical changes may be made without departing from the scope of the present disclosure. Therefore, the following detailed illustration should not be understood as limiting, and the present disclosure is defined by the appended claims.

Figure 1:
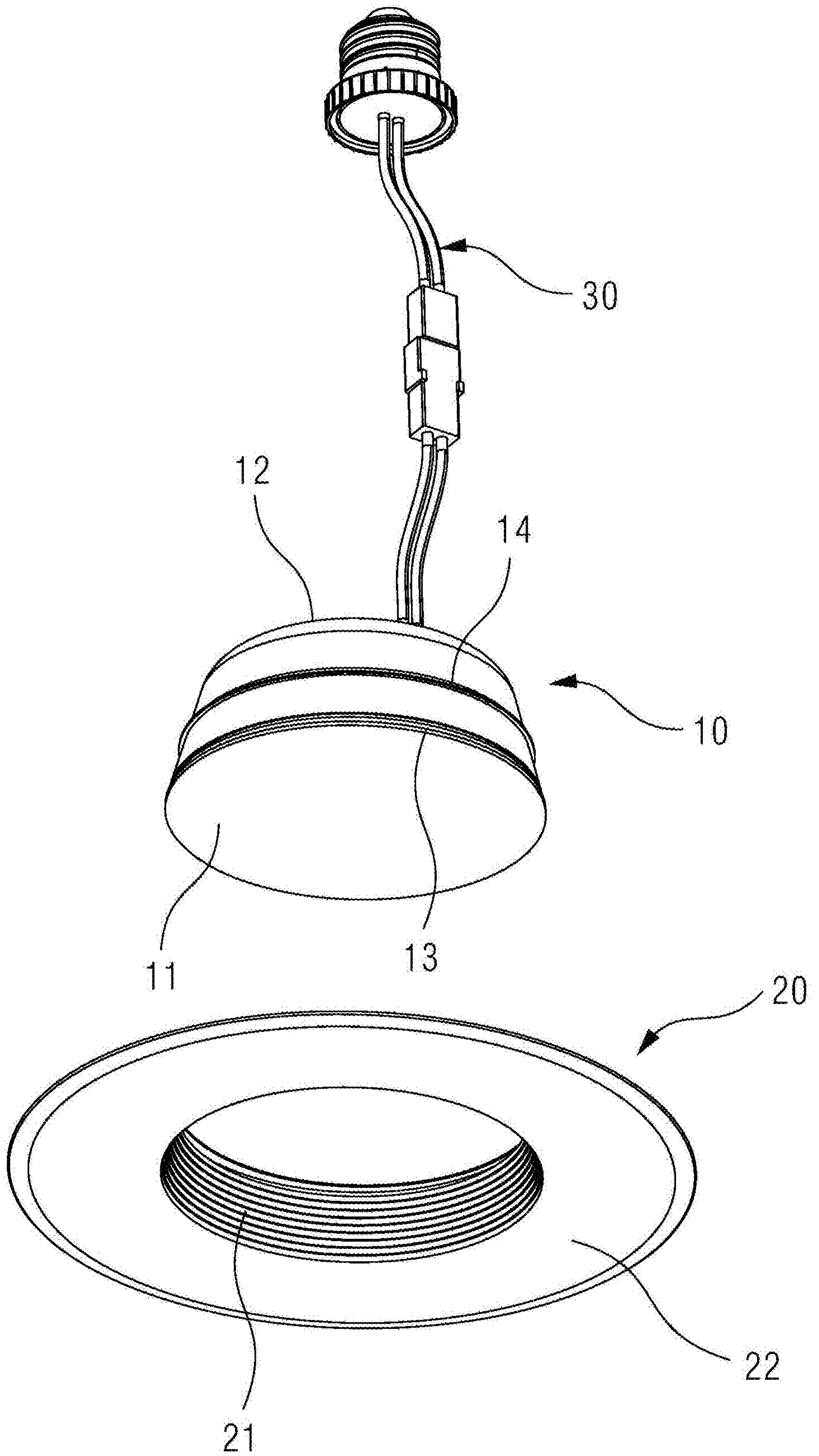
FIG. 1 is a schematic perspective view of a lamp assembly according to a first embodiment of the present disclosure.

First refer to FIG. 1, which shows a schematic perspective view of a lamp assembly according to a first embodiment of the present disclosure. The lamp assembly mainly comprises a lamp body 10 and a trim 20 arranged around the periphery of the lamp body 10. Certainly, the lamp assembly may further comprise other structures, such as electric wires 30 and spring members 40; and in order to avoid confusion, for components that are not directly related to the subject matter of the present application, details will not be described herein.

Refer to FIG. 1, the trim 20 comprises a hollow cylindrical body 21 and a trim ring 22, the trim ring 22 extending radially outward from the cylindrical body 21. In FIG. 1, the trim 20 is an integrated structure, and it can be understood that the trim 20 may also be formed by two separate parts that can be assembled together, that is, a left part and a right part, which also falls within the scope of the present disclosure.

Figure 2:
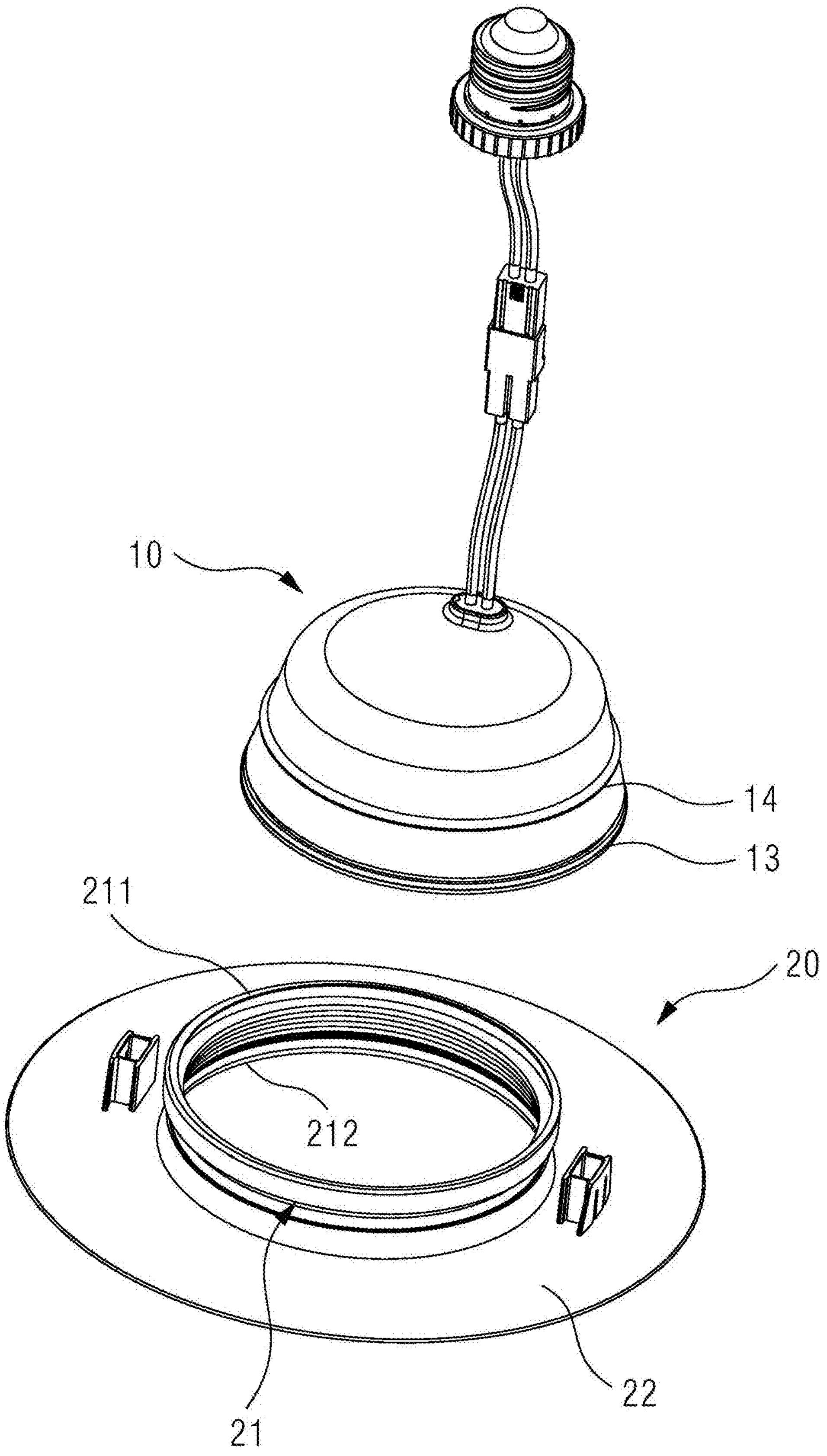
FIG. 2 is another schematic perspective view of the lamp assembly according to the first embodiment of the present disclosure, wherein a lamp body and a trim are separate and are intended to be mounted into a recessed mounting configuration.

The lamp body 10 comprises a light-emitting side 11 and a back side 12 opposite the light-emitting side 11; an axial extension direction of the lamp body 10 is defined between the light-emitting side 11 and the back side 12, the lamp body 10 is provided with a mounting device, and specifically, the mounting device may be a first mounting structure 13 and a second mounting structure 14. Refer to FIG. 2, the first mounting structure 13 of the lamp body 10 is located on an outer circumference of the light-emitting side 11 of the lamp body 10, and the second mounting structure 14 of the lamp body 10 is located on an outer circumference of a region between the light-emitting side 11 and the back side 12 of the lamp body 10.

The trim 20 is provided with a connecting device adapted to be connected to the mounting device of the lamp body 10. The mounting device of the lamp body 10 and the trim 20 are configured to have a first assembly position and a second assembly position different from the first assembly position. It can be understood that, in order to achieve two different assembly positions, the mounting device of the lamp body 10 may comprise a single mounting structure, and the connecting device of the trim 20 may comprise two different connecting structures; or the mounting device of the lamp body 10 may comprise two different mounting structures, and the connecting device of the trim 20 may comprise a single connecting structure. Of course, in order to achieve two different assembly positions, the mounting device of the lamp body 10 may comprise two different mounting structures, and the connecting device of the trim 20 may comprise two different connecting structures.

Figure 3:
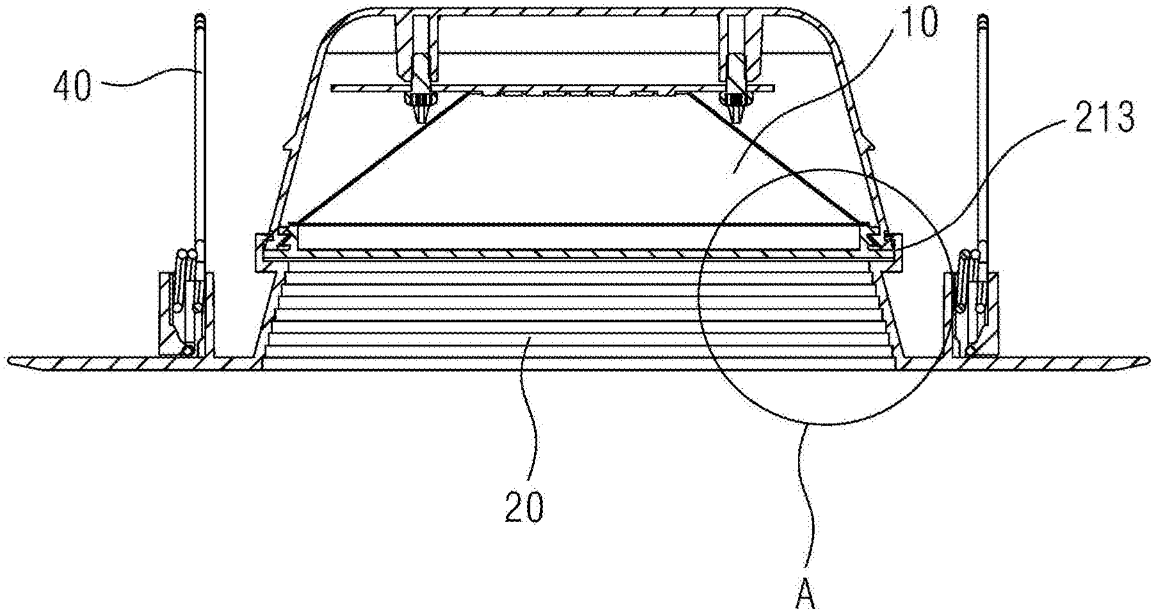
FIG. 3 is a schematic sectional view of the lamp assembly according to the first embodiment of the present disclosure, wherein a lamp body and a trim have been mounted into a recessed mounting configuration.
Figure 4:
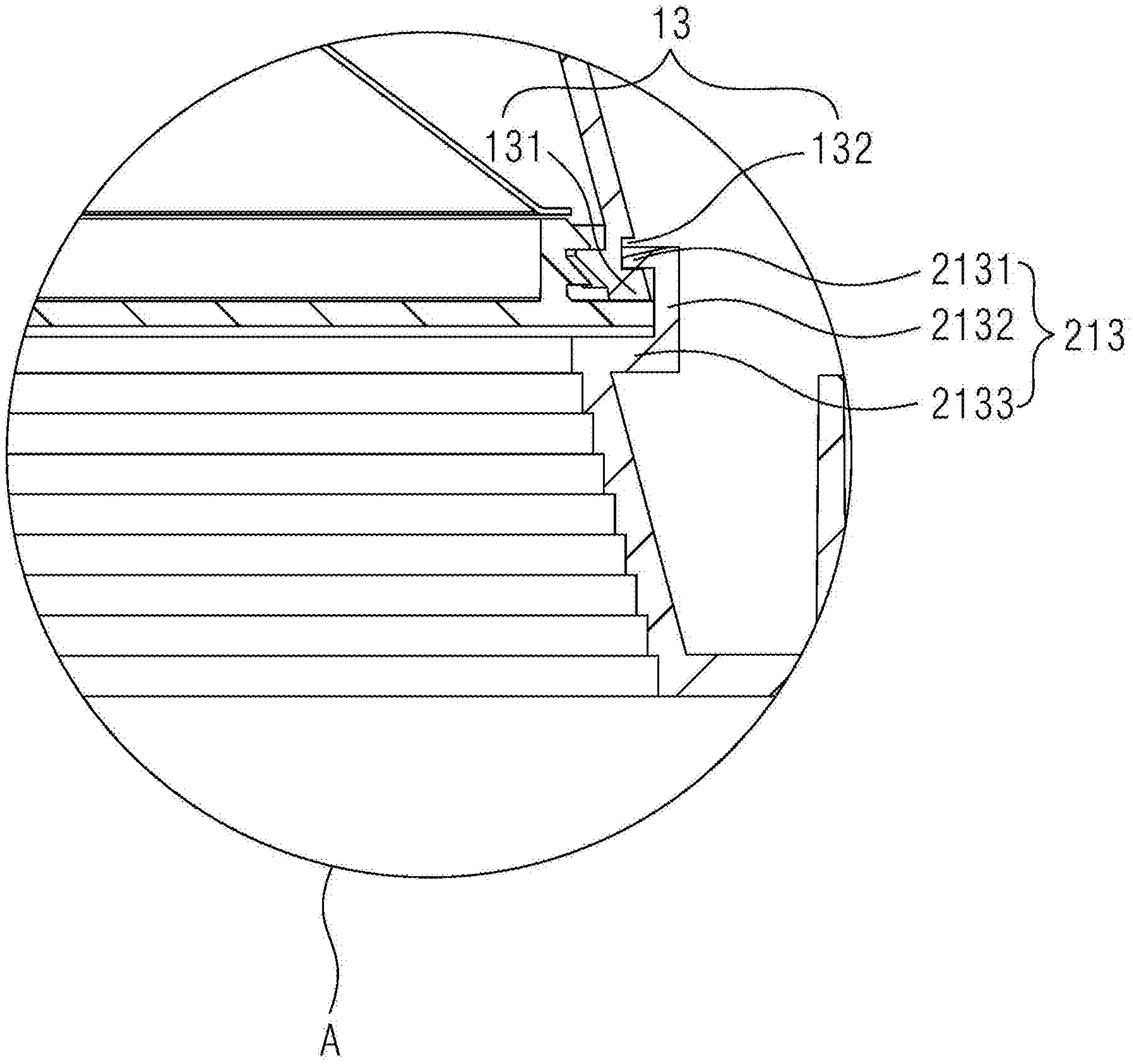
FIG. 4 is an enlarged view of a circled portion A in FIG. 3.

The connecting device of the trim 20 may specifically be an annular groove portion 213 arranged around the central axis of the cylindrical body 21 as shown in FIG. 3 and FIG. 4. The connecting device comprises a first connecting structure adapted to be connected to the first mounting structure and a second connecting structure adapted to be connected to the second mounting structure.

Figure 7:
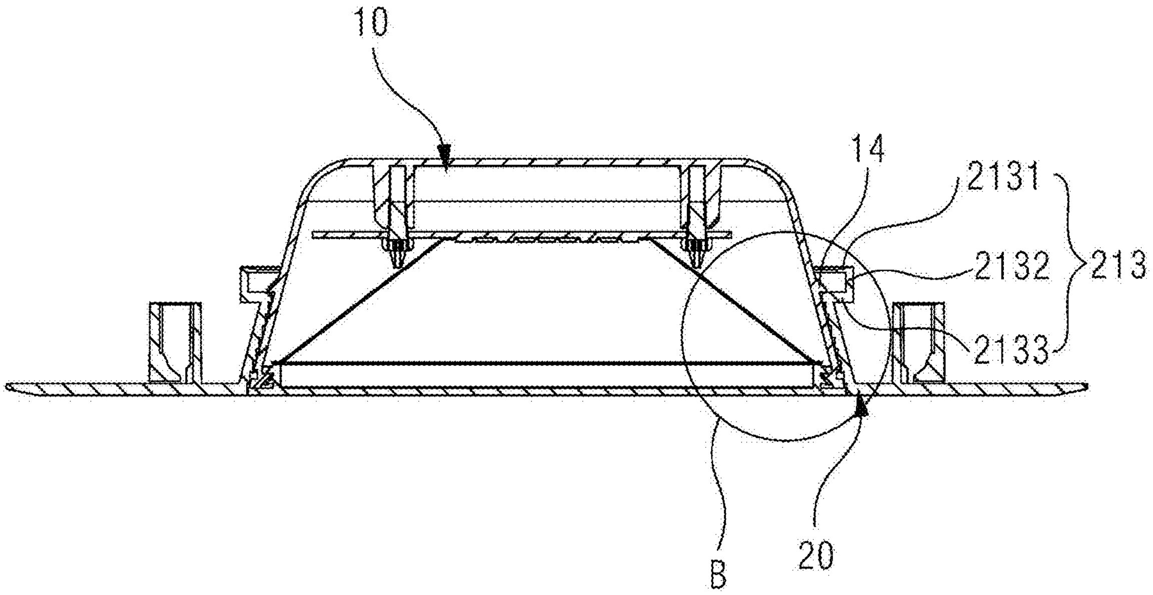
FIG. 7 is yet another schematic sectional view of the lamp assembly according to the first embodiment of the present disclosure, wherein the lamp body and the trim have been mounted into a flush mounting configuration.

Refer to FIG. 3 and FIG. 7, both the first mounting structure 13 and the second mounting structure 14 of the lamp body 10 are configured to be suitable for fitting into the structure of the annular groove portion 213 of the trim 20.

Refer to FIG. 4, which is an enlarged view of a circled portion A in FIG. 3, the annular groove portion 213 comprises a first wall 2131 and a second wall 2133 facing each other and an intermediate wall 2132 connecting the first wall 2131 and the second wall 2133, the first wall 2131 and the second wall 2133 extending in a radial direction of the cylindrical body 21, and the intermediate wall 2132 extending in an axial extension direction of the cylindrical body 21, wherein a radially inner end of the first wall 2131 forms the first connecting structure, and a radially inner end of the second wall 2133 forms the second connecting structure.

The trim 20 and the lamp body 10 are configured such that the lamp assembly may have a first mounting configuration and a second mounting configuration; the first mounting configuration may be, for example, a recessed mounting configuration in which the light-emitting side 11 of the lamp body 10 is mounted in a recessed manner relative to the trim ring 22; and the second mounting configuration may be, for example, a flush mounting configuration in which the light-emitting side 11 of the lamp body 10 is mounted flush with respect to the trim ring 22.

Certainly, it can be understood that, by modifying the embodiments of the present disclosure, the first mounting configuration and the second mounting configuration may also be in other forms, for example, both the first mounting configuration and the second mounting configuration are recessed mounting configurations, but the recessed depths of the light-emitting side 11 of the lamp body 10 are different. Or it may be contemplated that one of the first mounting configuration and the second mounting configuration may be such that the light-emitting side 11 of the lamp body 10 is mounted with respect to the trim ring 22 in a protruding manner.

Figure 5:
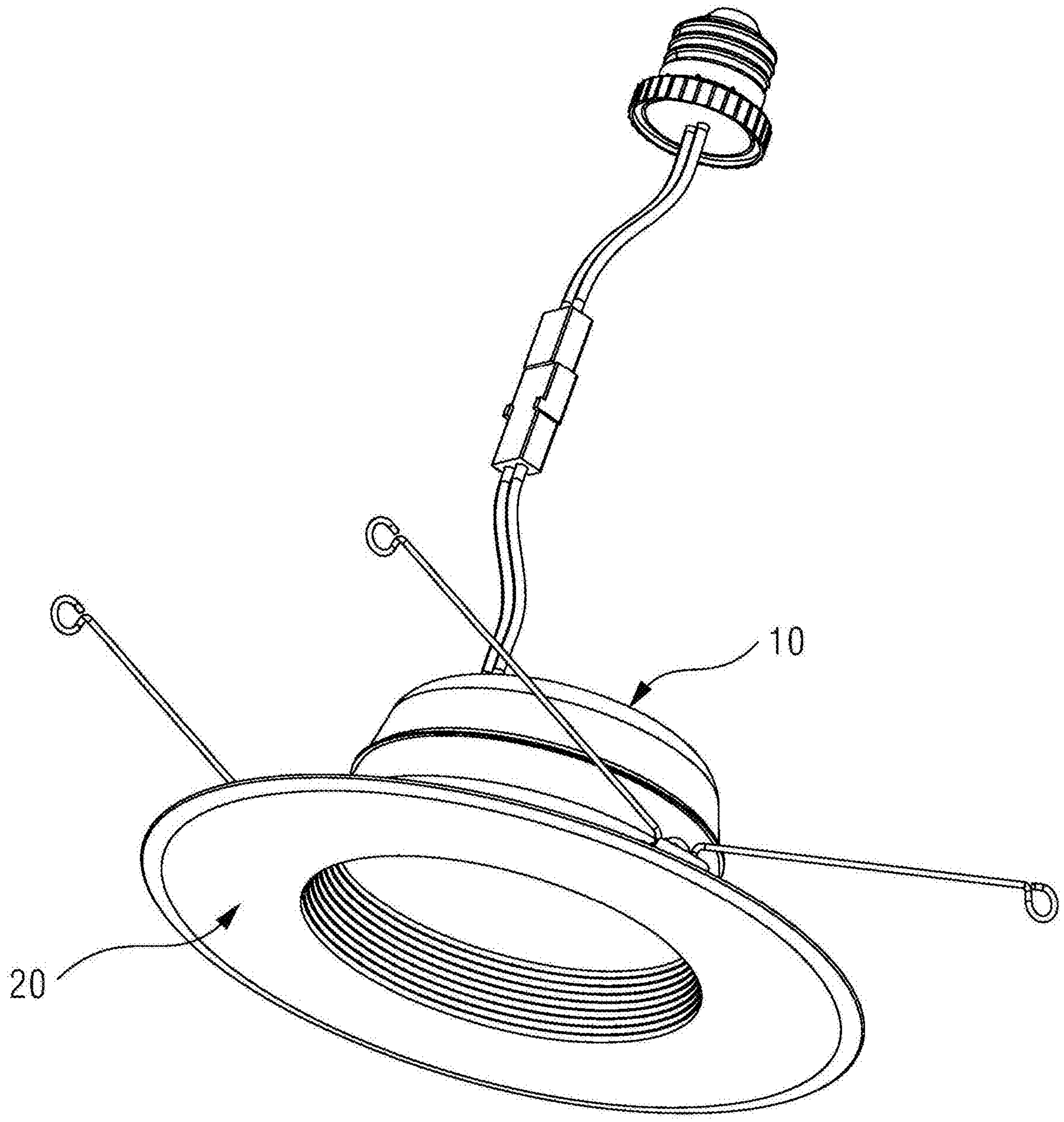
FIG. 5 is yet another schematic perspective view of the lamp assembly according to the first embodiment of the present disclosure, wherein the lamp body and the trim have been mounted into a recessed mounting configuration.
Figure 6:
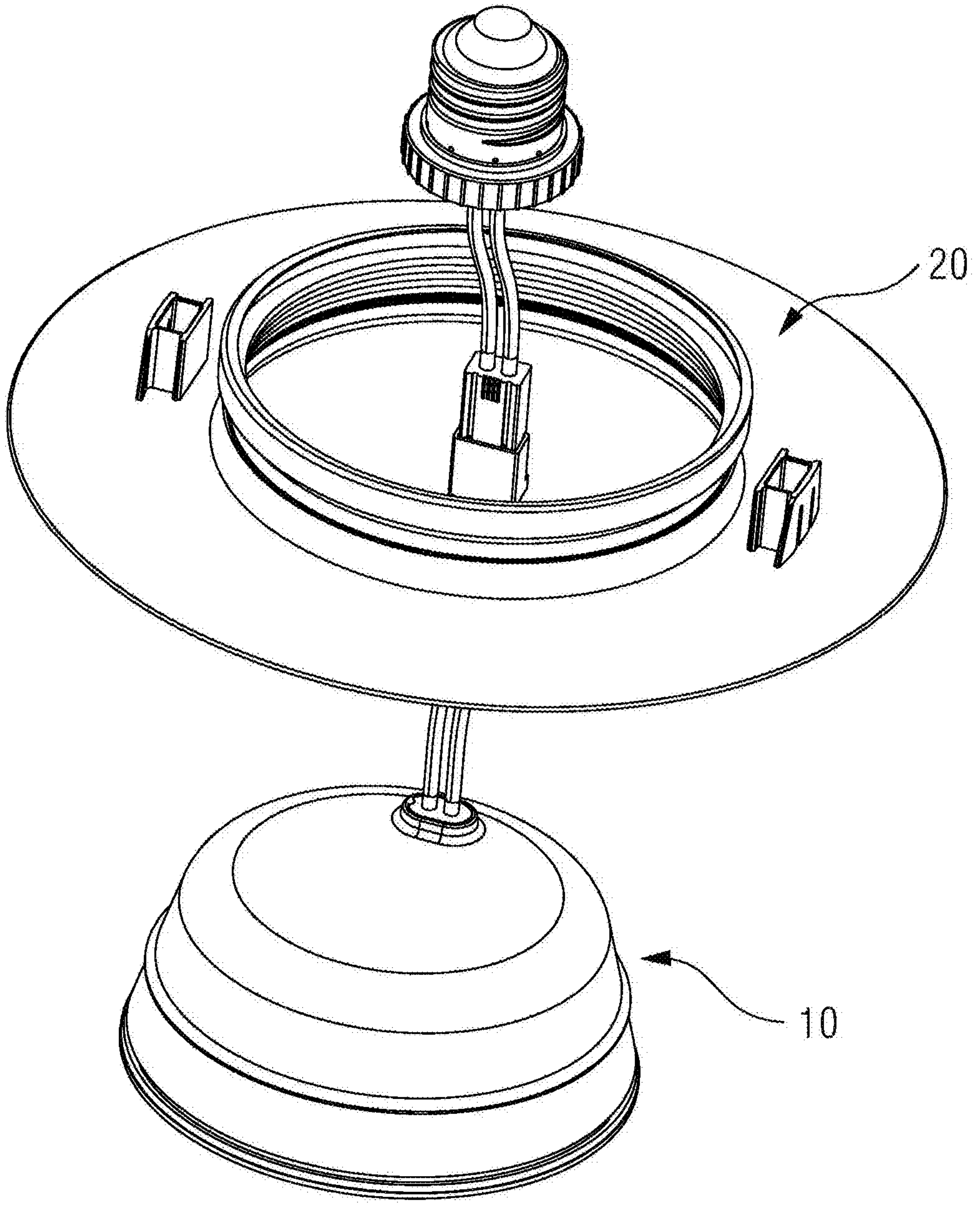
FIG. 6 is yet another schematic perspective view of the lamp assembly according to the first embodiment of the present disclosure, wherein the lamp body and the trim are separate and are intended to be mounted into a flush mounting configuration.
Figure 9:
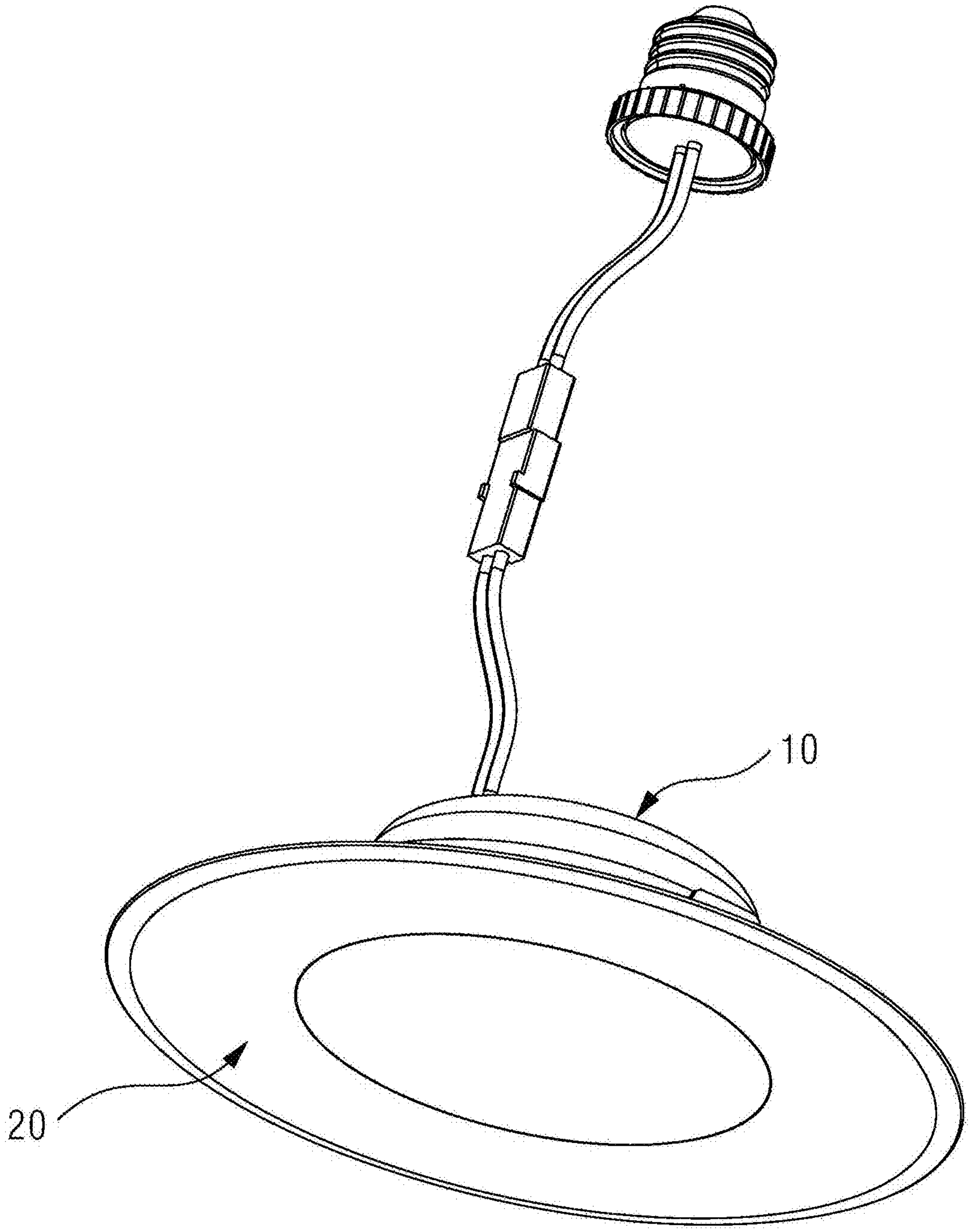
FIG. 9 is yet another schematic perspective view of the lamp assembly according to the first embodiment of the present disclosure, wherein the lamp body and the trim have been mounted into a flush mounting configuration.

Refer to FIGS. 3 and 5, in the recessed mounting configuration, the trim 20 is mounted in a direction from the light-emitting side 11 toward the back side 12 of the lamp body 10, and the trim 20 is mounted to the first mounting structure 13 of the lamp body 10 by using the first wall 2131 as the first connecting structure. Refer to FIGS. 7 and 9, in the flush mounting configuration, the trim 20 is mounted in a direction from the back side 12 toward the light-emitting side 11 of the lamp body 10, and the trim 20 is mounted to the second mounting structure 14 of the lamp body 10 by using the second wall 2133 as the second connecting structure. In the recessed mounting configuration and the flush mounting configuration, the positions of the trim 20 with respect to the lamp body 10 in the axial extension direction are different.

With reference to FIGS. 3 and 7, it can be understood that the lamp assembly has a central axis, and a first radial distance from a joining position between the first mounting structure 13 and the first connecting structure to the central axis is greater than a second radial distance from a joining position between the second mounting structure 14 and the second connecting structure to the central axis.

Refer to FIG. 2, the cylindrical body 21 has a first end 211 and a second end 212 opposite the first end 211, and the direction from the first end to the second end is consistent with the light-emitting direction of the light-emitting side of the lamp body 10. Refer to FIG. 3, the cylindrical body 21 has a tapered shape in a direction from the second end 212 to the first end 211. The annular groove portion 213 is provided at the first end 211 of the cylindrical body 21, and the trim ring 22 is provided at the second end 212 of the cylindrical body 21.

Figure 8:
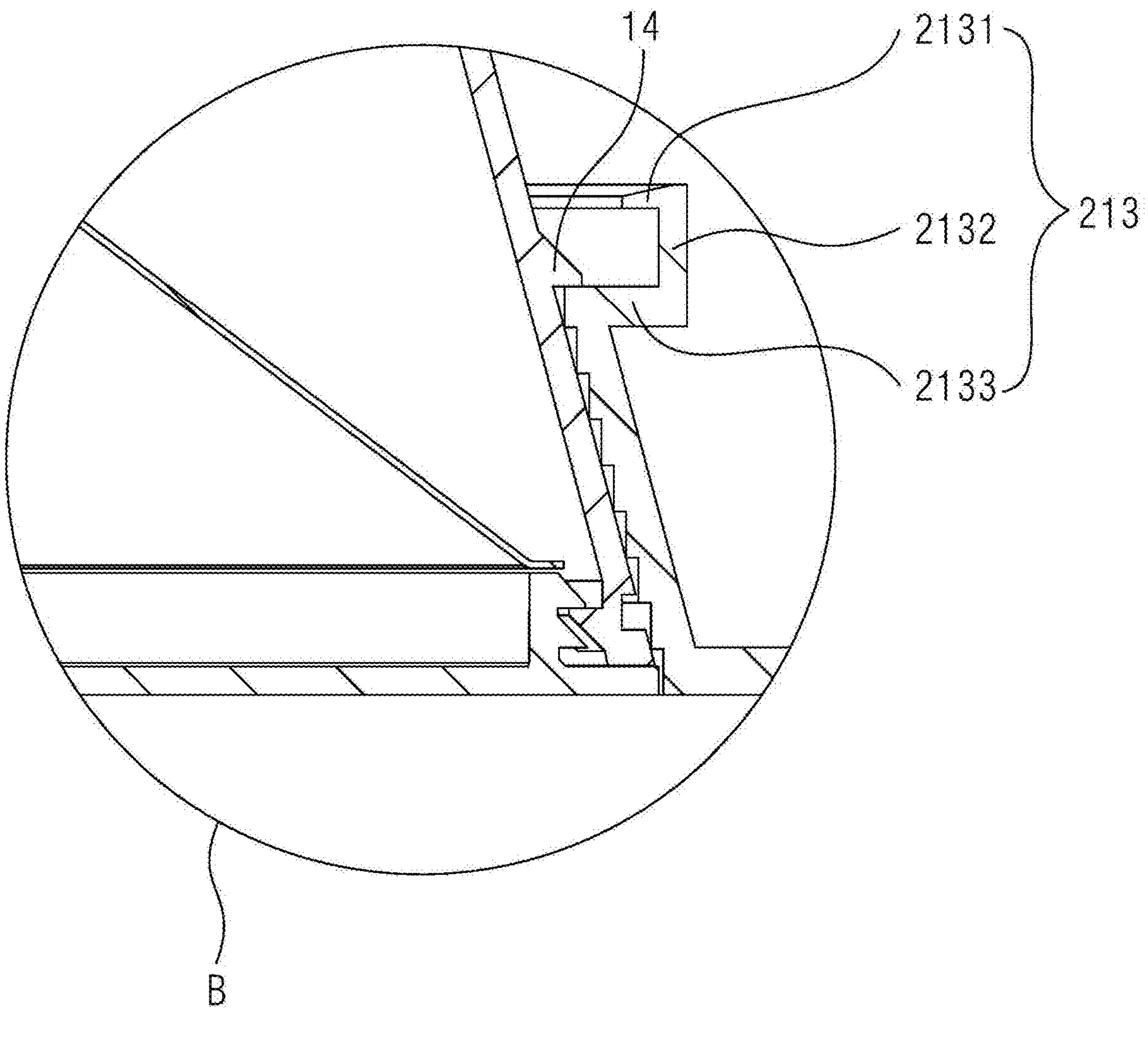
FIG. 8 is an enlarged view of a circled portion B in FIG. 7.

Refer to FIG. 8, which shows an enlarged view of a circled portion B in FIG. 7, the second mounting structure 14 of the lamp body 10 has a wedge shape in cross section; the wedge shape comprises a planar surface extending in the radial direction of the lamp body 10 and an inclined surface inclined relative to the planar surface, and the planar surface is configured to be adapted to abut against the surface of the second wall 2133 of the annular groove portion 213 in the flush mounting configuration. It can be understood that the distance between the planar surface of the second mounting structure 14 and the bottom surface (i.e. the light-emitting side 11) of the lamp body 10 is equal to the distance between the surface of the second wall 2133 of the annular groove portion 213 of the trim 20 and the bottommost surface of the trim, thereby realizing the flush mounting configuration of the lamp assembly.

With reference to FIG. 4, the first mounting structure 13 of the lamp body 10 has an annular flange 131 on the outer circumference of the light-emitting side 11 of the lamp body 10 and a recessed portion 132 on one side of the annular flange 131; the annular flange 131 is configured to be suitable for fitting into the annular groove portion 213 of the connecting device in the recessed mounting configuration, and the recessed portion 132 is adapted to receive the first wall 2131 of the annular groove portion 213.

In the first embodiment of the present disclosure, both the cylindrical body 21 and the lamp body 10 are made of a material having certain elasticity, such as a plastic material, so as to achieve the connection between the cylindrical body 21 and the lamp body 10. It can be understood that, the first connecting structure of the cylindrical body 21 and the first mounting structure 13 of the lamp body 10 may also be connected by any one or more connection manners of threaded connection, screw connection, magnetic connection, clamp connection, etc.; furthermore, the second connecting structure of the cylindrical body 21 and the second mounting structure 14 of the lamp body 10 may also be connected by any one or more connection manners of threaded connection, screw connection, magnetic connection, clamp connection, etc.

Figure 10:
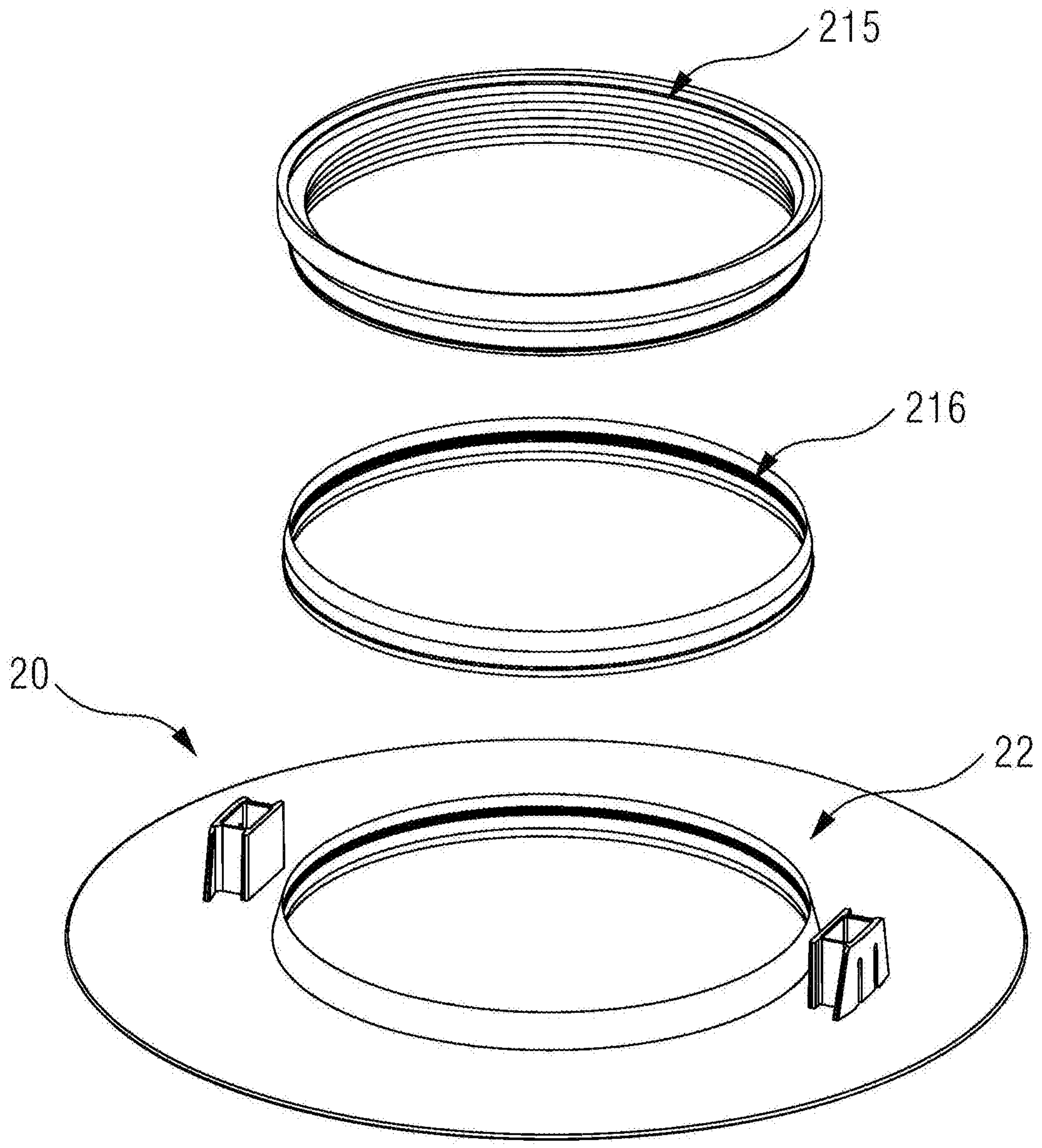
FIG. 10 is a perspective view of a trim of a lamp assembly according to a second embodiment of the present disclosure, wherein a cylindrical body of the trim comprises a plurality of detachable annular segments.
Figure 11:
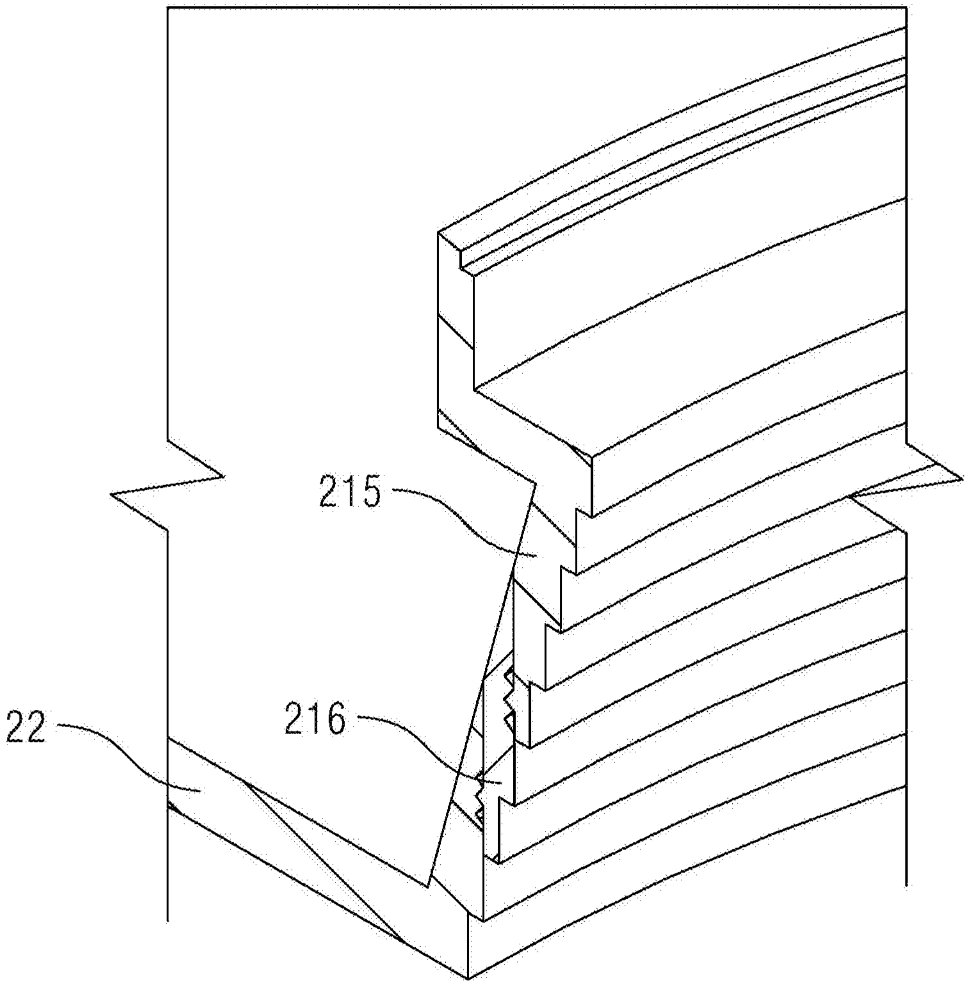
FIG. 11 is a schematic partial sectional view of the trim of the lamp assembly according to the second embodiment of the present disclosure.
Figure 12:
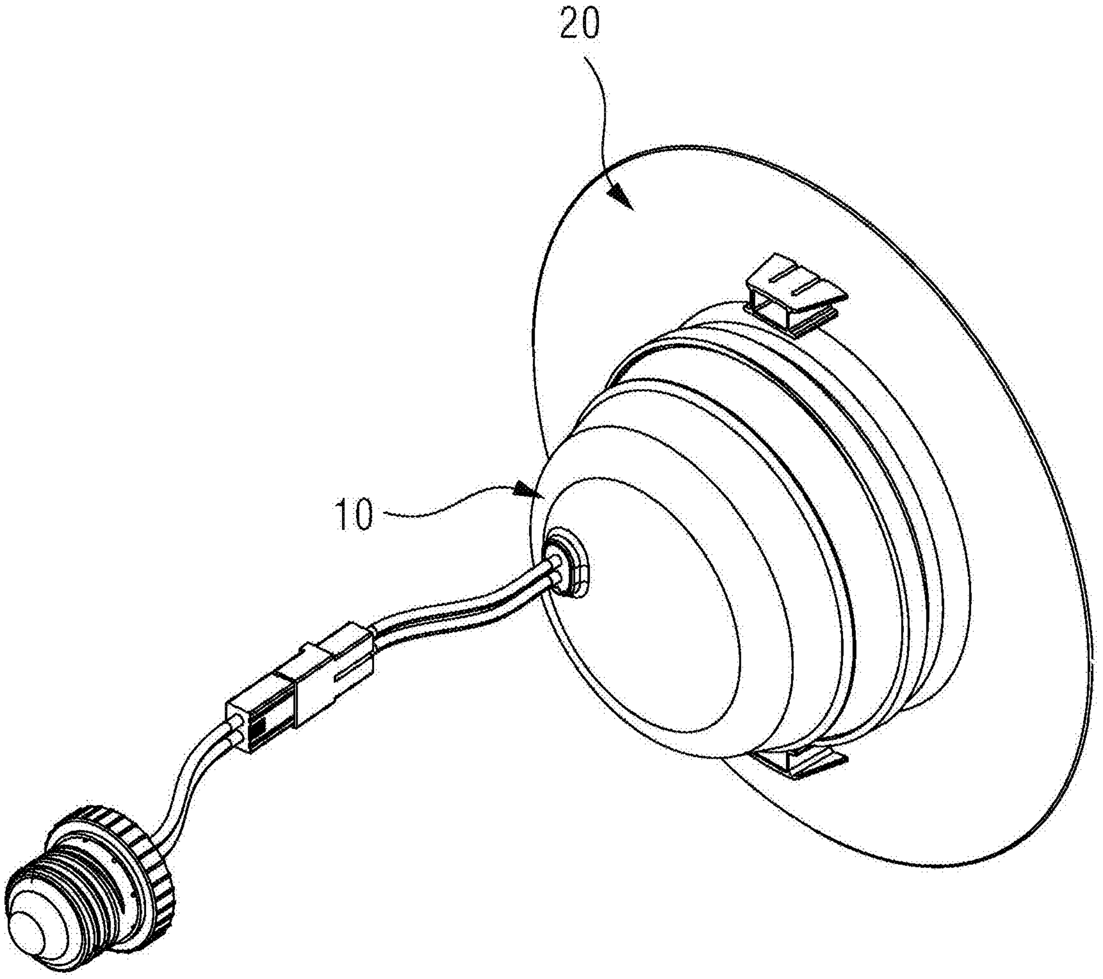
FIG. 12 is a schematic perspective view of the lamp assembly according to the second embodiment of the present disclosure.

Refer to FIGS. 10-12, a lamp assembly and a trim therefor according to a second embodiment of the present disclosure are shown. The cylindrical body of the trim 20 comprises a plurality of detachable annular segments, such as a first segment 215 and a second segment 216, so as to select a proper number of segments according to requirements, thereby realizing different recessed depths of the light-emitting side 11 of the lamp body 10 with respect to the trim ring 22, and satisfying the glare requirements of different users. The cylindrical body may be formed of a material having certain elasticity.

Refer to FIGS. 13-16, a lamp assembly and a trim therefor according to a third embodiment of the present disclosure are shown. The lamp assembly may be a downward-emitting lamp assembly, in particular an ultra-thin downward-emitting lamp assembly.

Figure 13:
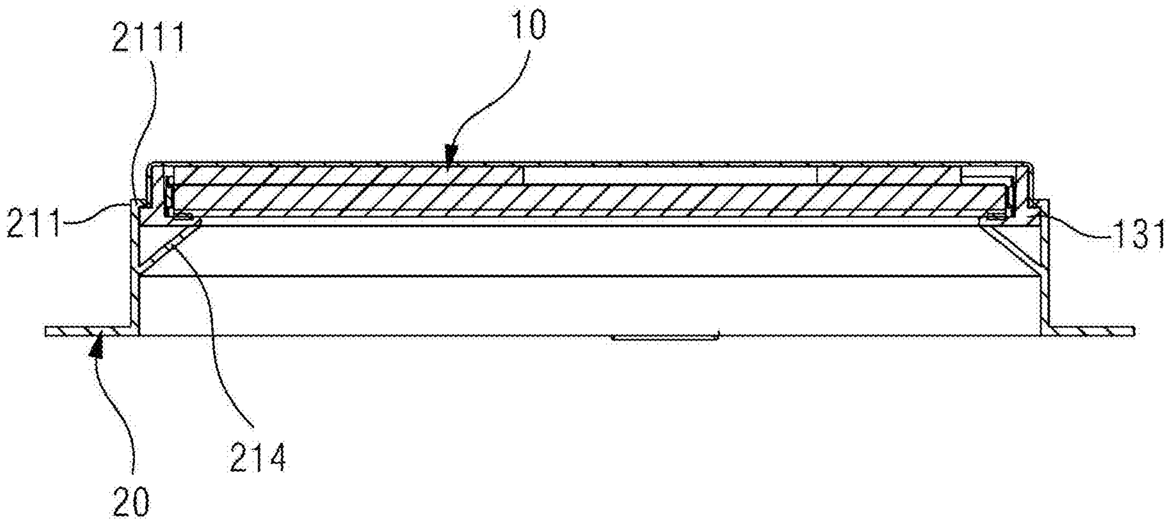
FIG. 13 is a schematic sectional view of a lamp assembly according to a third embodiment of the present disclosure, wherein a lamp body and a trim have been mounted into a recessed mounting configuration.

Refer to FIG. 13, the trim 20 comprises a support wall 214 extending upwardly and radially inwardly from a central region of the inner circumference of the cylindrical body 21 toward the first end 211 of the cylindrical body 21; and the support wall 214 and the first end 211 of the cylindrical body 21 serve as the first connecting structure to be assembled with the first mounting structure 13 on the lamp body 10, thereby realizing the recessed mounting configuration. A snap-fit portion 2111 protruding inward in the radial direction is arranged at the first end 211 so as to be snapped together with the annular flange 131 on the light-emitting side of the lamp body 10. Specifically, the top end of the support wall 214 and the snap-fit portion 2111 of the first end 211 together serve as the first connecting structure of the trim 20, and the annular flange 131 on the light-emitting side of the lamp body 10 may serve as the first mounting structure of the lamp body 10.

Figure 14:
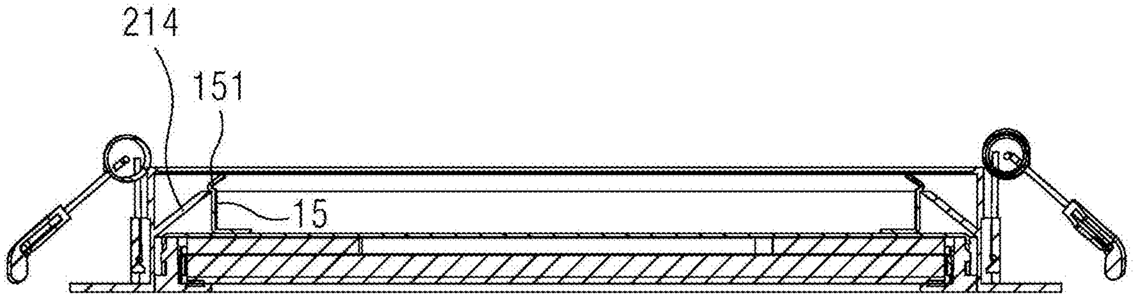
FIG. 14 is another schematic sectional view of the lamp assembly according to the third embodiment of the present disclosure, wherein the lamp body and the trim have been mounted into a flush mounting configuration.
Figure 15:
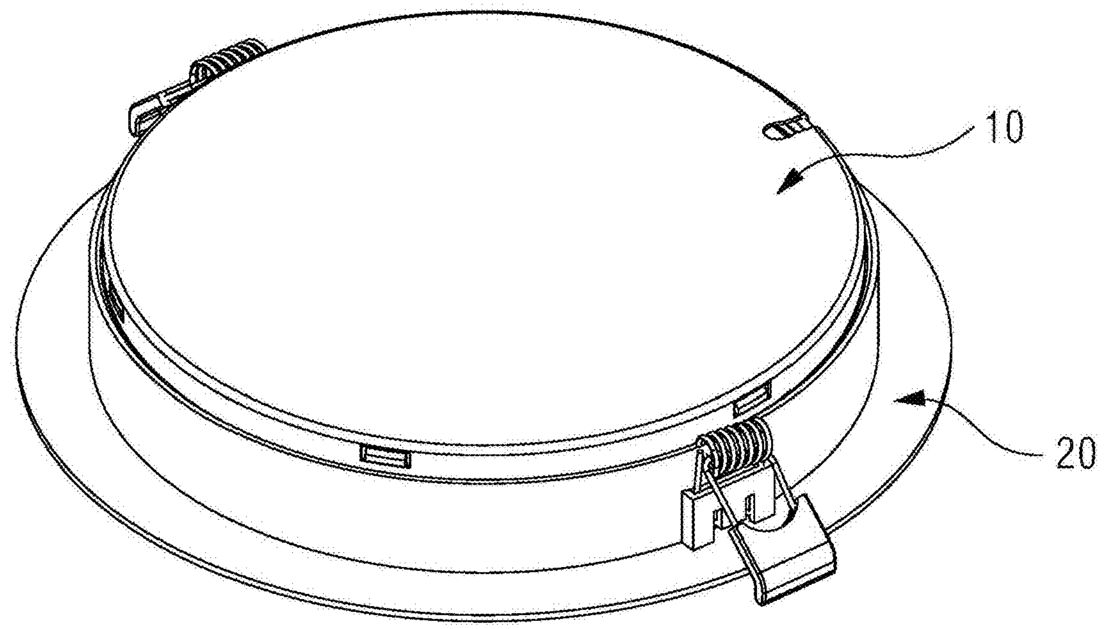
FIG. 15 is a schematic perspective view of the lamp assembly according to the third embodiment of the present disclosure, wherein the lamp body and the trim have been mounted into a recessed mounting configuration.
Figure 16:
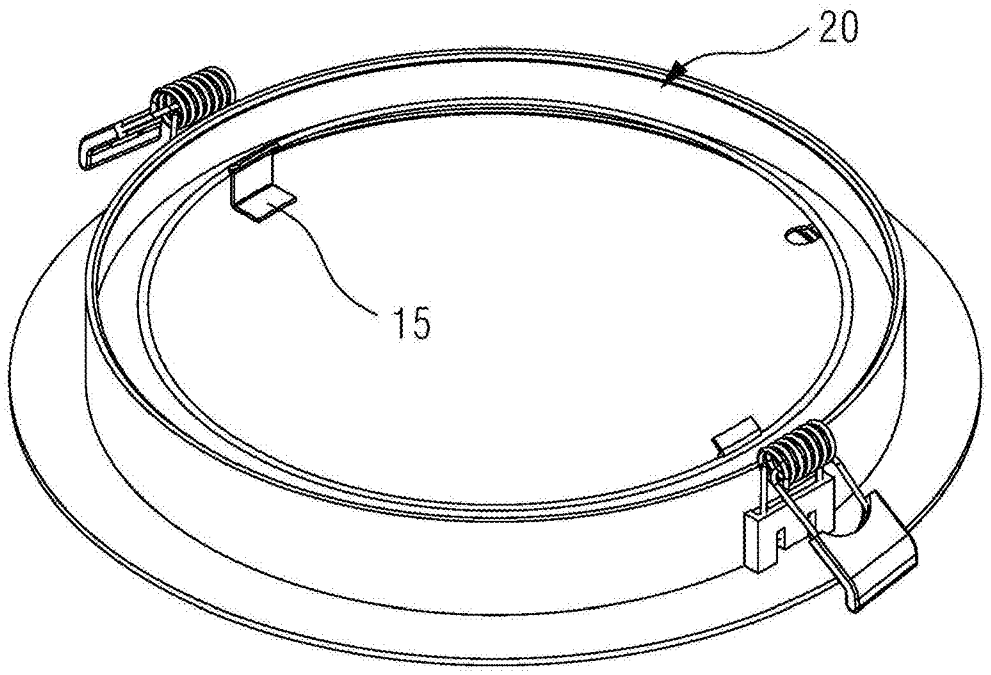
FIG. 16 is another schematic perspective view of the lamp assembly according to the third embodiment of the present disclosure, wherein the lamp body and the trim have been mounted into a flush mounting configuration.

Refer to FIG. 14, the lamp body 10 comprises a mounting frame 15 detachably provided on the back side 12 of the lamp body 10, the mounting frame 15 being provided with a snap-fit portion 151. In the flush mounting configuration, the snap-fit portion 151 can be used as the second mounting structure, the tail end of the support wall 214 can be used as the second connecting structure, and the snap-fit portion 151 is adapted to receive and fix the tail end of the support wall 214.

The described content merely relates to preferred embodiments of the present disclosure, and is not intended to limit the present disclosure. Any modifications, equivalent replacements, improvements, etc. made within the spirit and principle of the present disclosure shall all fall within the scope of protection of the present disclosure.

The invention claimed is:

1. A lamp assembly, comprising a lamp body and a trim arranged around the periphery of the lamp body, wherein
- the trim comprises:
- a hollow main body; and
- a trim ring, extending radially outward from the hollow main body,
- wherein the lamp body comprises a light-emitting side and a back side opposite the light-emitting side, an axial extension direction of the lamp body is defined between the light-emitting side and the back side, and the lamp body is provided with a mounting device;
- wherein the trim is provided with a connecting device adapted to be connected to the mounting device of the lamp body,
- wherein the mounting device and the connecting device are configured to have a first assembly position and a second assembly position different from the first assembly position,
- wherein the trim and the lamp body are configured such that the lamp assembly has a first mounting configuration and a second mounting configuration, in which in the first mounting configuration, the trim is mounted in a direction from the light-emitting side toward the back side of the lamp body, and the trim and the lamp body are assembled together in the first assembly position; and in the second mounting configuration, the trim is mounted in a direction from the back side toward the light-emitting side of the lamp body, and the trim and the lamp body are assembled together in the second assembly position wherein in the first mounting configuration and the second mounting configuration, the positions of the trim with respect to the lamp body in the axial extension direction are different, wherein the first mounting configuration is a recessed mounting configuration in which the light-emitting side of the lamp body is mounted in a recessed manner relative to the trim ring, and wherein the second mounting configuration is a flush mounting configuration in which the light-emitting side of the lamp body is mounted flush with respect to the trim ring.

2. The lamp assembly according to claim 1, wherein the hollow main body of the trim is a cylindrical body;

the mounting device of the lamp body comprises a first mounting structure and a second mounting structure; the connecting device of the trim comprises a first connecting structure adapted to be connected to the first mounting structure and a second connecting structure adapted to be connected to the second mounting structure;

in the first mounting configuration, the trim is mounted to the first mounting structure on the lamp body by using the first connecting structure;

in the second mounting configuration, the trim is mounted to the second mounting structure on the lamp body by using the second connecting structure; and the lamp assembly has a central axis, and a first radial distance from a joining position between the first mounting structure and the first connecting structure to the central axis is greater than a second radial distance from a joining position between the second mounting structure and the second connecting structure to the central axis.

3. The lamp assembly according to claim 2, wherein the cylindrical body has a first end and a second end opposite the first end, and the direction from the first end to the second end is consistent with the light-emitting direction of the light-emitting side of the lamp body, and the cylindrical body has a tapered shape in a direction from the second end to the first end.

4. The lamp assembly according to claim 3, wherein the connecting device is provided at the first end of the cylindrical body, and the trim ring is provided at the second end of the cylindrical body.

5. The lamp assembly according to claim 2, wherein the first mounting structure of the lamp body is located on an outer circumference of the light-emitting side of the lamp body, and the second mounting structure of the lamp body is located on an outer circumference of a region between the light-emitting side and the back side of the lamp body; and one or both of the first mounting structure and the second mounting structure of the lamp body are configured with a flange or groove in a radial direction, and one or both of the first connecting structure and the second connecting structure of the trim are correspondingly configured with a matching groove or flange in the radial direction.

6. The lamp assembly according to claim 2, wherein the connecting device of the cylindrical body comprises an annular groove portion arranged around a central axis of the cylindrical body, and both the first mounting structure and the second mounting structure of the lamp body are configured to be suitable for fitting into the structure of the annular groove portion; and the annular groove portion comprises a first wall and a second wall facing each other and an intermediate wall connecting the first wall and the second wall, the first wall and the second wall extending in a radial direction of the cylindrical body, and the intermediate wall extending in an axial extension direction of the cylindrical body, wherein a radially inner end of the first wall forms the first connecting structure, and a radially inner end of the second wall forms the second connecting structure.

7. The lamp assembly according to claim 6, wherein the second mounting structure of the lamp body has a wedge shape in cross section; the wedge shape comprises a planar surface extending in the radial direction of the lamp body and an inclined surface inclined relative to the planar surface, and the planar surface is configured to be adapted to abut against the surface of the second wall of the annular groove portion in the second mounting configuration.

8. The lamp assembly according to claim 6, wherein the first mounting structure of the lamp body has an annular flange on the outer circumference of the light-emitting side of the lamp body and a recessed portion on one side of the annular flange; the annular flange is configured to be suitable for fitting into the annular groove portion of the connecting device in the first mounting configuration, and the recessed portion is adapted to receive the first wall of the annular groove portion.

9. The lamp assembly according to claim 2, wherein the cylindrical body of the trim comprises a plurality of detachable annular segments, so as to achieve different recessed depths of the light-emitting side of the lamp body with respect to the trim ring.

10. The lamp assembly according to claim 2, wherein the first connecting structure of the cylindrical body and the first mounting structure of the lamp body are connected by any one or more connection manners of snap-fit connection, threaded connection, magnetic connection and clamp connection; and the second connecting structure of the cylindrical body and the second mounting structure of the lamp body are connected by any one or more connection manners of snap-fit connection, threaded connection, magnetic connection and clamp connection.

11. The lamp assembly according to claim 2, wherein the lamp assembly is a downward-emitting lamp assembly, the cylindrical body has a first end and a second end opposite the first end, and the direction from the first end to the second end is consistent with the light-emitting direction of the light-emitting side of the lamp body; and the trim comprises a support wall extending upwardly and radially inwardly from a central region of the inner circumference of the cylindrical body toward the first end of the cylindrical body; and the support wall and the first end of the cylindrical body together serve as the first connecting structure to be assembled with the first mounting structure on the lamp body, thereby realizing the first mounting configuration.

12. The lamp assembly according to claim 11, wherein the lamp body comprises a mounting frame detachably provided on the back side of the lamp body, the mounting frame being provided with a snap-fit portion; in the second mounting configuration, the snap-fit portion is used as the second mounting structure, the tail end of the support wall is used as the second connecting structure, and the snap-fit portion is adapted to receive and fix the tail end of the support wall.

13. A trim for a lamp assembly, the lamp assembly comprising a lamp body and the trim arranged around the periphery of the lamp body, wherein the trim comprises:

a hollow cylindrical body; and a trim ring, extending radially outward from the hollow cylindrical body, wherein the lamp body comprises a light-emitting side and a back side opposite the light-emitting side, an axial extension direction of the lamp body is defined between the light-emitting side and the back side, and the lamp body is provided with a mounting device;

wherein the trim is provided with a connecting device adapted to be connected to the mounting device of the lamp body, and wherein the mounting device and the connecting device are configured to have a first assembly position and a second assembly position different from the first assembly position, wherein the trim and the lamp body are configured such that the lamp assembly has a first mounting configuration and a second mounting configuration, in which in the first mounting configuration, the trim is mounted in a direction from the light-emitting side toward the back side of the lamp body, and the trim and the lamp body are assembled together in the first assembly position; and in the second mounting configuration, the trim is mounted in a direction from the back side toward the light-emitting side of the lamp body, and the trim and the lamp body are assembled together in the second assembly position wherein in the first mounting configuration and the second mounting configuration, the positions of the trim with respect to the lamp body in the axial extension direction are different, wherein the first mounting configuration is a recessed mounting configuration in which the light-emitting side of the lamp body is mounted in a recessed manner relative to the trim ring, and wherein the second mounting configuration is a flush mounting configuration in which the light-emitting side of the lamp body is mounted flush with respect to the trim ring.

14. The trim for a lamp assembly according to claim 13, wherein the mounting device of the lamp body comprises a first mounting structure and a second mounting structure; the connecting device of the trim comprises a first connecting structure adapted to be connected to the first mounting structure and a second connecting structure adapted to be connected to the second mounting structure;

in the first mounting configuration, the trim is mounted to the first mounting structure on the lamp body by using the first connecting structure;

in the second mounting configuration, the trim is mounted to the second mounting structure on the lamp body by using the second connecting structure; and the lamp assembly has a central axis, and a first radial distance from a joining position between the first mounting structure and the first connecting structure to the central axis is greater than a second radial distance from a joining position between the second mounting structure and the second connecting structure to the central axis.

15. The trim for a lamp assembly according to claim 14, wherein the hollow cylindrical body has a first end and a second end opposite the first end, and the direction from the first end to the second end is consistent with the light-emitting direction of the light-emitting side of the lamp body, the hollow cylindrical body has a tapered shape in a direction from the second end to the first end.

16. The trim for a lamp assembly according to claim 15, wherein the connecting device is provided at the first end of the hollow cylindrical body, and the trim ring is provided at the second end of the hollow cylindrical body.

17. The trim for a lamp assembly according to claim 14, wherein the connecting device of the hollow cylindrical body comprises an annular groove portion arranged around a central axis of the hollow cylindrical body, and both the first mounting structure and the second mounting structure of the lamp body are configured to be suitable for fitting into the structure of the annular groove portion; and the annular groove portion comprises a first wall and a second wall facing each other and an intermediate wall connecting the first wall and the second wall, the first wall and the second wall extending in a radial direction of the hollow cylindrical body, and the intermediate wall extending in an axial extension direction of the hollow cylindrical body, wherein a radially inner end of the first wall forms the first connecting structure, and a radially inner end of the second wall forms the second connecting structure.

18. The trim for a lamp assembly according to claim 14, wherein the hollow cylindrical body (21) of the trim (20) comprises a plurality of detachable annular segments, so as to achieve different recessed depths of the light-emitting side of the lamp body with respect to the trim ring.

19. The trim for a lamp assembly according to claim 14, wherein the first connecting structure of the hollow cylindrical body and the first mounting structure of the lamp body are connected by any one or more connection manners of snap-fit connection, threaded connection, magnetic connection and clamp connection; and the second connecting structure of the hollow cylindrical body and the second mounting structure of the lamp body are connected by any one or more connection manners of snap-fit connection, threaded connection, magnetic connection and clamp connection.

20. The trim for a lamp assembly according to claim 14, wherein the lamp assembly is a downward-emitting lamp assembly, the hollow cylindrical bod has a first end and a second end opposite the first end, and the direction from the first end to the second end is consistent with the light-emitting direction of the light-emitting side of the lamp body; and the trim comprises a support wall extending upwardly and radially inwardly from a central region of the inner circumference of the hollow cylindrical body toward the first end of the hollow cylindrical body; and the support wall and the first end of the hollow cylindrical body together serve as the first connecting structure to be assembled with the first mounting structure on the lamp body, thereby realizing the first mounting configuration.

21. A lamp assembly, comprising a lamp body and a trim arranged around the periphery of the lamp body, wherein wherein the lamp body comprises a light-emitting side and a back side opposite the light-emitting side, an axial extension direction is defined between the light-emitting side and the back side, and the lamp body is provided with at least a mounting device;

wherein the trim is provided with at least a connecting device adapted to be connected to the mounting device of the lamp body, wherein the trim and the lamp body are configured such that the lamp assembly has a first mounting configuration, in which the trim is mounted in a direction from the light-emitting side toward the back side of the lamp body, and the light-emitting side of the lamp body is mounted in a recessed manner relative to the trim; and a second mounting configuration, in which the trim is mounted in a direction from the back side toward the light-emitting side of the lamp body, and the light-emitting side of the lamp body is mounted flush with respect to the trim.

* * * * *